(12) United States Patent
Byrne et al.

(10) Patent No.: US 7,570,174 B2
(45) Date of Patent: Aug. 4, 2009

(54) REAL TIME ALARM CLASSIFICATION AND METHOD OF USE

(75) Inventors: Joseph Byrne, Gardiner, NY (US); Harry D. Clark, Walden, NY (US); Gary R. Moore, Milton, NY (US); Michael L. Passow, W. Hurley, NY (US); Yiheng Xu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 11/693,162

(22) Filed: Mar. 29, 2007

(65) Prior Publication Data

US 2008/0238699 A1   Oct. 2, 2008

(51) Int. Cl.
*G08B 17/10* (2006.01)
(52) U.S. Cl. ........................................ 340/632
(58) Field of Classification Search .............. 340/632, 340/634, 514; 250/339.13, 492.1; 438/14, 438/17, 711
See application file for complete search history.

(56) References Cited

U.S. PATENT DOCUMENTS 6,664,119 B2 * 12/2003 Choi et al. ..................... 438/14
2003/0008422 A1 * 1/2003 Frees et al. .................... 438/14
2008/0029484 A1 * 2/2008 Park et al. ..................... 216/67
2008/0083885 A1 * 4/2008 Wilhelmus Van Herpen et al. ................................................ 250/493.1

* cited by examiner

*Primary Examiner*—Phung Nguyen
(74) *Attorney, Agent, or Firm*—Rosa S. Yaghmour; Greenblum & Bernstein P.L.C.

(57) ABSTRACT

A real time alarm classification system and method of use and, more particularly, to a residual gas analyzer configured to identify specific root causes of an abnormal condition such as, for example, contamination, undesirable process variability and equipment malfunction in wafer processing. The real-time alarm classification system comprises a computer infrastructure operable to: generate top contributors associated with an alarm triggered by sensed abnormal conditions; compare the top contributors to contributors of historic RGA (residual gas analyzer) alarms of known root causes that were generated by a validated model; and provide a probable root cause of the sensed abnormal conditions when a match is found between the top contributors and the contributors associated with the historic RGA alarms of known root causes. A method and computer readable medium is also contemplated to provide the processes.

2 Claims, 8 Drawing Sheets

| Matched Contributor | Largest Contributors Match | Second Contributors Match | Third Contributors Match |
|---|---|---|---|
| Assigned Score | 3 | 2 | 1 |

FIG. 6a

| Total Score | >3 | =3 | <3 |
|---|---|---|---|
| Matching Test Result | Probable Match | Possible Match | No Match |

FIG. 6b

RGA Alarm Classification Table

| RGA ALARM CLASSIFICATION | LARGEST CONTRIBUTOR | SECOND CONTRIBUTOR | THIRD CONTRIBUTOR | COMMENTS |
|---|---|---|---|---|
| Alarm Root Cause 1 | Mass 99 | Mass 98 | Mass 70 | |
| Alarm Root Cause 2 | Mass 67 | Mass 82 | Mass 20 | |
| Alarm Root Cause 3 | Mass 59 | Mass 58 or 34 | Mass 58 or 34 | |
| Alarm Root Cause "N" | | | | |

Contributors to Contamination

| LARGEST CONTRIBUTOR | SECOND CONTRIBUTOR | THIRD CONTRIBUTOR |
|---|---|---|
| Mass 99 | Mass 98 | Mass 20 |

Scoring

| RGA ALARM CLASSIFICATION | LARGEST CONTRIBUTOR | SECOND CONTRIBUTOR | THIRD CONTRIBUTOR | TOTAL |
|---|---|---|---|---|
| Alarm Root Cause 1 | 3 | 2 | 0 | 5 |
| Alarm Root Cause 2 | 0 | 0 | 1 | 1 |
| Alarm Root Cause 3 | 0 | 0 | 0 | 0 |
| Alarm Root Cause "N" | | | | |

FIG. 7

Observed residual on the
backside of the alarmed wafer

REAL TIME ALARM CLASSIFICATION AND METHOD OF USE

FIELD OF THE INVENTION

The invention generally relates to a real time alarm classification system and method of use and, more particularly, to a residual gas analyzer configured to identify specific root causes of abnormal conditions such as contamination, undesirable process variabilities and equipment malfunction in wafer processing.

BACKGROUND OF THE INVENTION

A residual gas analyzer (RGA) is a mass spectrometer, typically designed for process control and contamination monitoring in the semiconductor industry. RGAs may be found in high vacuum applications such as research chambers, surface science setups, accelerators, scanning microscopes, thermal degassing chambers, etc., used in most cases to monitor the quality of the vacuum and to detect minute traces of impurities (contaminants) in a low pressure gas environment. In some applications, the RGAs are capable of measuring impurities down to $10^{-14}$ Torr levels.

In one illustrative example, the RGA may be used to monitor the thermal degas process of the PVD process in a degassing chamber. In such an application, the RGA can be used to detect many types of contaminants and process variabilities within the thermal degas process. This is mainly due to the fact that most RGA applications are designed to generate generic alarms to cover many different types of contaminants (or undesirable process variabilities or equipment malfunction). However, since the RGA alarm is generic, such RGA application is not capable of determining the exact contaminant (or undesirable process variabilities or equipment malfunction); it is only capable of triggering generic alarm when any abnormal condition arises. Some of the different types of abnormal conditions which may be detected by the RGA include, amongst other types of contaminants and process variabilities:

- photoresist chemicals which were not properly or completely stripped in previous processes;
- photoresist developer;
- ARC film residue;
- chemicals used in wet cleaning process;
- residual contaminations within the degas chamber, itself;
- process variabilities in upstream processes, e.g., arcing in the etch process; and/or
- Gas leakage in the degas chamber.

The RGA is also capable of detecting outgassing of moisture (e.g., water) from the chamber due to water absorption by the wafer during wafer processing. Although the outgassing of water is typically considered normal, there may be situations where an excessive amount of moisture may be indicative of contamination issues.

In the case that any contamination or process variability is detected, the RGA will trig an alarm alerting a technician to a potential contamination issue. In such case, the tool (degassing chamber) is stopped to ensure that such contamination (or undesirable process variabilities or equipment malfunction) will not damage other processing chambers in the process flow. Of course, the shut-down of the tool will negatively impact the throughput of the entire wafer processing.

Once the tool is shutdown, the processing engineer (sensor/control engineer) must review the raw sensor data and compare such data to the historical data to interpret the spectrum. To find the root cause, the manufacturing team is required to check the process history of the alarmed product (e.g., the problem with the wafer). This is due to the fact that the RGA generates generic alarms, and is incapable of determining the exact contaminant or root cause of the contamination (or undesirable process variabilities or equipment malfunction). The analysis of the raw RGA data and wafer history will allow the team to properly diagnose the problem, fix any processing issues relating to such problem, and restart the wafer processing. The diagnosis of the root cause involves the collective experience of the engineering team and, of course, diagnosis will vary depending on the experience level of each team member.

It is also of importance to note that diagnosis of the root cause is very time consuming, averaging more than two hours of engineering time and two hours of the process time per RGA alarm. In some cases, depending on the complexity of the problem, the diagnosis can take even longer.

Also, due to the experience level of the engineering team, mistakes are apt to occur which can be costly to manufacturing in yield loss and process tool availability. Therefore, without knowing the root cause of RGA alarms, people usually take a very conservative approach to handle RGA alarms. In other words, technicians scrap wafers and clean tools after RGA alarms regardless of the root causes of the RGA alarms. Obviously this can cause unnecessary wafer loss and tool down time. The understanding of the root cause of the RGA alarm is required for proper and prompt handling of RGA alarms.

Also due to the complexity associated with analysis of RGA alarms, RGAs often have to be limited to specific applications; that is, the RGA may be limited to detecting a single specific type of contaminant, e.g., only to detect photoresist or $O_2$ contaminants. The problem with this approach is such RGA applications are not designed to detect all types of contamination, which may lead to undetected contamination issues in downstream processes. These RGA applications do not address the entirety of the potential root cause. For this and other reasons, such specific application RGAs are known to cause unnecessary tool down time and yield loss for the downstream processes, when a contaminant is missed.

Accordingly, there exists a need in the art to overcome the deficiencies and limitations described hereinabove.

SUMMARY OF THE INVENTION

In a first aspect of the invention, a real-time alarm classification system comprises a computer infrastructure operable to: use a validated model to generate top contributors associated with an alarm triggered by sensed abnormal conditions; compare the top contributors to contributors of historic RGA (residual gas analyzer) alarms of known root causes that were generated by a validated model; and provide a probable root cause of the sensed abnormal conditions when a match is found between the top contributors of the sensed abnormal conditions and the contributors associated with the historic RGA alarms of known root causes.

In a second aspect of the invention, a method comprises monitoring a process for abnormal conditions and comparing the data of a found abnormal condition to a library that has historical abnormal condition data with associated known root causes. The method further includes identifying a root cause of the found abnormal condition and notifying a team member of the root cause associated with the abnormal condition.

In another aspect of the invention, a computer program product comprises a computer usable medium having a computer readable program embodied in the medium. The computer readable program when executed on a computing device is operable such that the computing device can: generate top contributors of an abnormal condition; compare the top contributors of current abnormal condition to contributors of the historic abnormal condition that were generated by a validated model; and provide a probable root cause of the sensed abnormal condition when a match is found between the top contributors of current abnormal condition to contributors of the historic abnormal conditions that were generated by a validated model.

DETAILED DESCRIPTION OF EMBODIMENTS OF THE INVENTION

The invention generally relates to a real time alarm classification system and method of use and, more particularly, to a residual gas analyzer configured to identify specific root causes of an abnormal condition such as, contamination, undesirable process variability and equipment malfunction in wafer processing. The system and method of the invention is contemplated for use in wafer manufacturing processes and more particularly in RGA applications; however, it should be recognized that the system and method of the invention is not limited to such applications. For example, the system and method of the invention can be expanded to new types of RGA alarms, new RGA applications and applications of other sensors in semiconductor or non-semiconductor manufacturing processes. The system and method of the invention further opens opportunities for more advanced RGA based process control.

Advantageously, by implementing the system and method of the invention, it is now possible to provide real time RGA alarm classification with no or minimal human intervention. This leads to faster diagnosis of the root cause of an abnormal condition such as, contamination, undesirable process variability and equipment malfunction in wafer processing, which, in turn, leads to improved throughput in the processing of wafers or other product. Also, it is now possible to take the institutional knowledge of experienced engineers (or other team members) and integrate such knowledge in multivariate analysis based process control in semiconductor manufacturing.

System Environment

Figure 1:
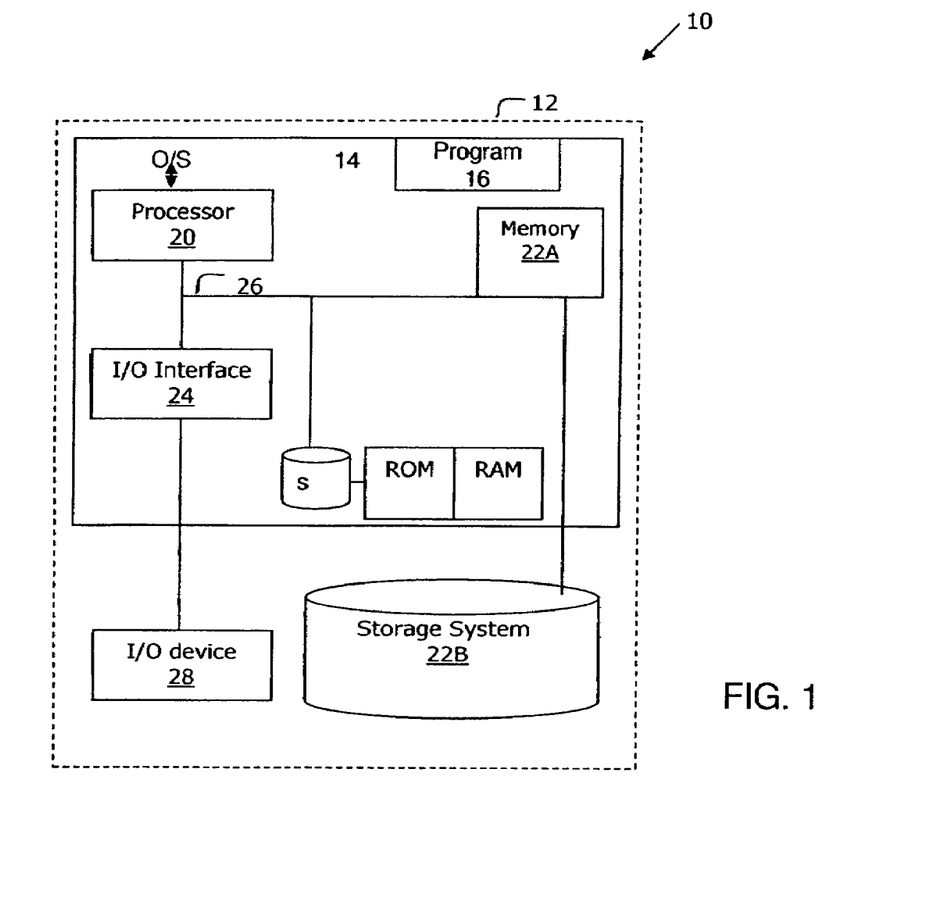
FIG. 1 shows an environment for implementing the processes in accordance with the invention.

FIG. 1 shows an illustrative environment 10 for managing the processes in accordance with the invention. The illustrative environment may be a server or a user workstation, for example, and may represent a processing environment configured to identify specific root causes of contamination in wafer processing or other processing environments. The system can be implemented over any type of distributed network such as, for example, the Internet, LAN, WAN, etc. In one preferred embodiment, the illustrative environment is implemented on any server-based system using any known operating system.

The environment includes computer infrastructure 12 having computing device 14. More specifically, computing device 14 includes program 16, which is configured and structured to, amongst other features, identify specific root causes of an abnormal condition such as contamination, undesirable process variability and equipment malfunction in wafer processing by comparing RGA data to a classification table. Additionally, in embodiments, program 16 includes executable code, which may be stored temporarily or permanently in memory 22A. As should be understood by those of skill in the art, the executable code can be configured to implement the above functions.

Still referring to FIG. 1, memory 22A can include local memory employed during actual execution of program code, bulk storage, and cache memories which provide temporary storage of at least some program to reduce the number of times code must be retrieved from bulk storage during execution. Computer infrastructure 12 further includes input/output (I/O) interface 24, bus 26, Storage "S", ROM, RAM and external I/O device/resource 28. Storage "S" may be any type of appropriate database.

External I/O device/resource 28 may be a keyboard, display, pointing device, or any device that enables computer infrastructure 12 to communicate with one or more other computing devices using any type of communications link 30. Communications link 30 can be, for example, wired and/or wireless links; one or more types of networks (e.g., the Internet, a wide area network, a local area network, a virtual private network, etc.); and/or any known transmission techniques and protocols.

Processor 20 executes the computer program code and logic of the system and method of the invention, which is stored in memory 22A. While executing the computer program code, etc., processor 20 can read and/or write data to/from memory 22A, storage system 22B, storage "S" and/or I/O interface 24. Bus 26 provides a communications link between each of the components in computing device 14.

Tool Configuration

Figure 2:
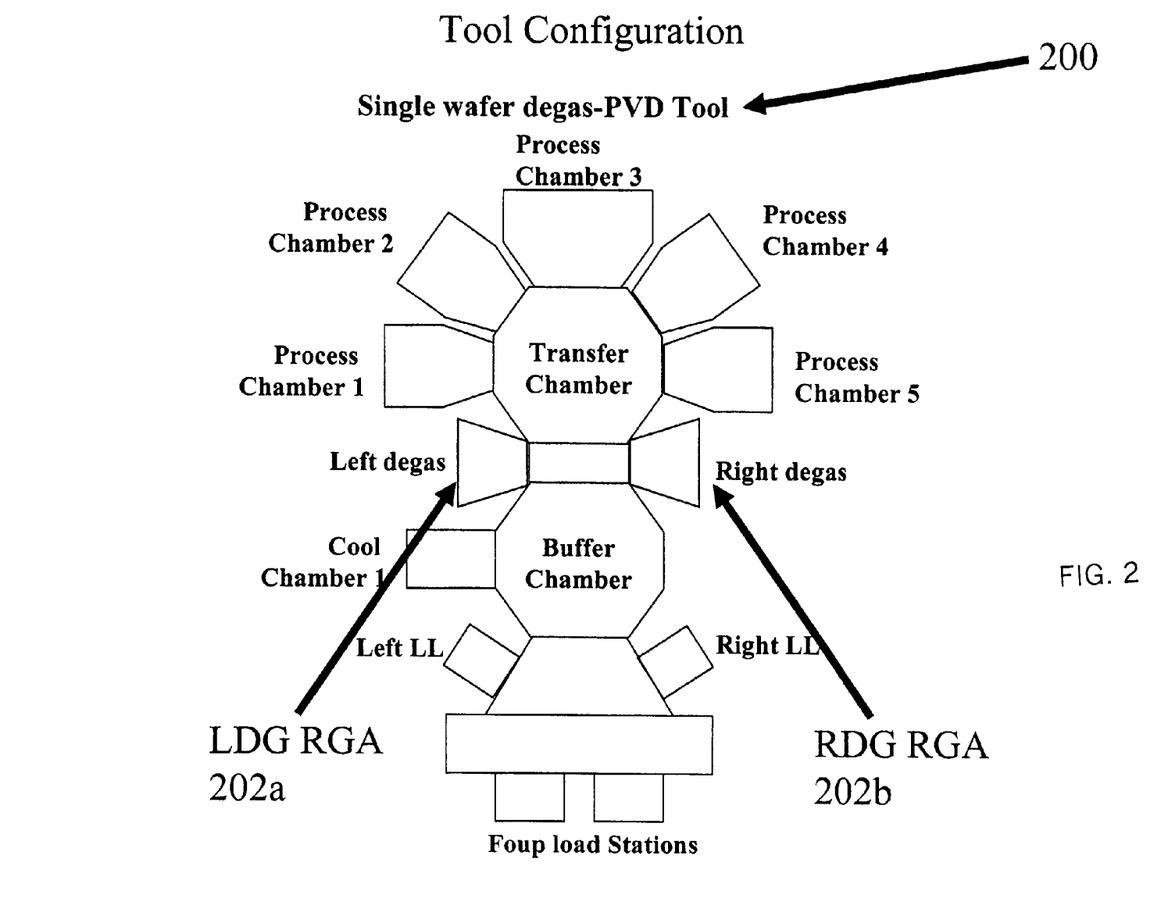
FIG. 2 shows an exemplary tool configuration which can be implemented with the invention.

FIG. 2 shows an exemplary tool configuration which can be implemented with the invention. The tool configuration, in embodiments, is a single wafer degas chamber 200 with two RGAs 202a and 202b. In embodiments, the RGAs 202a and 202b generate generic alarms and are capable of detecting a full spectrum of contaminants, undesirable process variabilities and/or equipment malfunctions in wafer processing, amongst other abnormal processing conditions. The contaminants may include, amongst others, photoresist chemicals, photoresist developer chemicals, $O_2$ and other gases, moisture, etc. In implementation, once a contaminant (or undesirable process variability or equipment malfunction) is detected, the RGA will trigger an alarm. In addition, by implementing the systems and processes of the invention, contamination data (and other abnormal conditions such as, undesirable process variabilities and equipment malfunctions) can be compared to contamination data of known root causes in order to determine the specific root cause of the detected abnormal condition.

It should be recognized that the tool configuration of FIG. 2 is only an illustrative example of a tool configuration implementing the system and method of the invention. For example, the system and method of the invention can be implemented in other upstream or downstream processing chambers, as well as in non-semiconductor processes.

Flow Diagram Implementing Steps of the Invention

Figure 3:
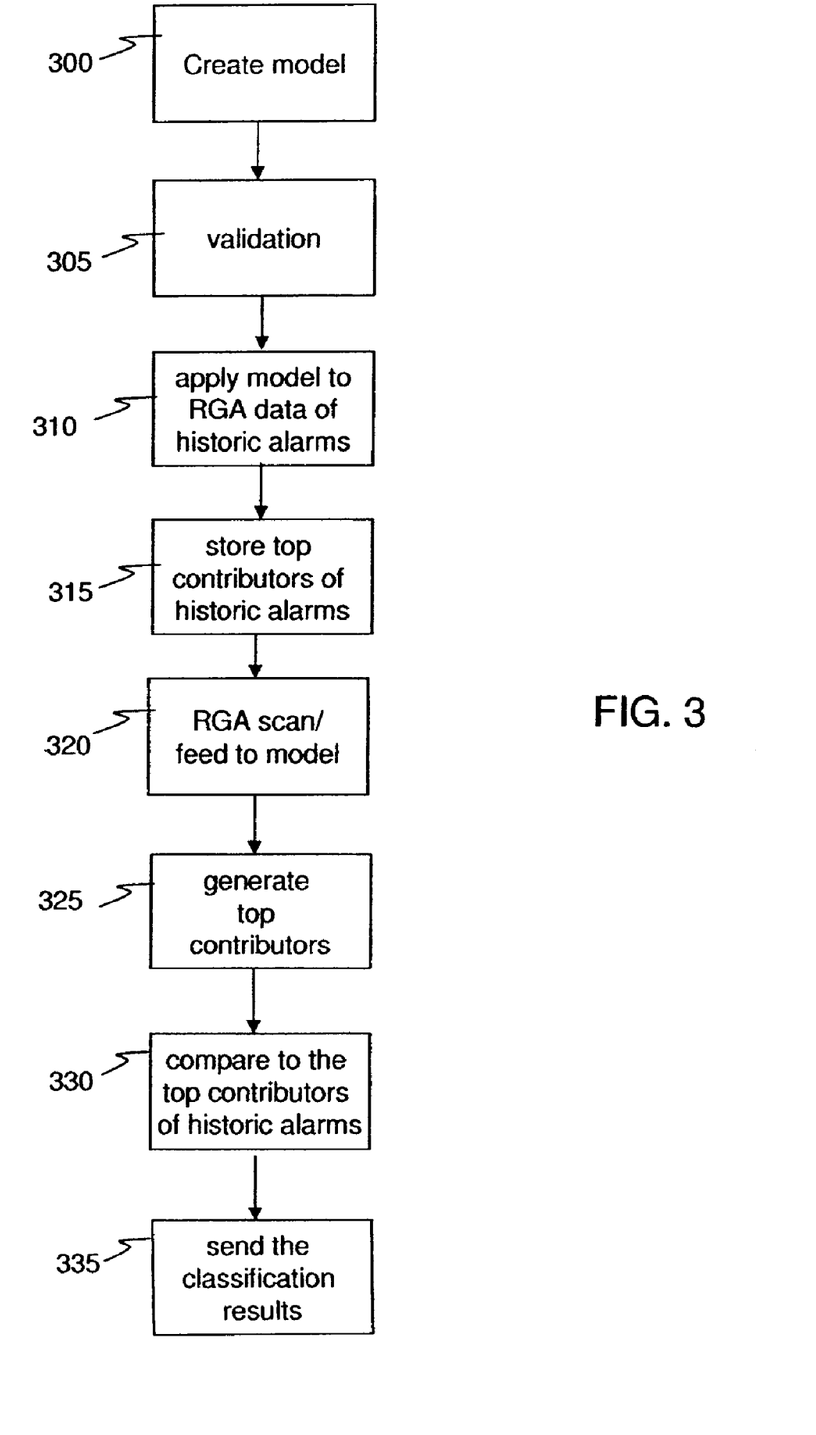
FIG. 3 represents a flow diagram implementing steps of various embodiments of the invention.

FIG. 3 represents a flow diagram implementing steps of various embodiments of the invention. The steps of FIG. 3 (and other flow diagrams described herein) may be implemented in the environment of FIG. 1. The steps of the invention may equally represent a high-level block diagram of the invention.

The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

In embodiments, the invention can be provided by a service provider which creates, maintains, deploys, supports, etc., a computer infrastructure that performs the process steps of the invention for one or more customers. The environment of FIG. 1 may be representative of the computer infrastructure. In return, the service provider can receive payment from the customer(s) under a subscription and/or fee agreement.

Referring to FIG. 3, at step 300, a multivariate analysis (MVA) model is created using historic RGA data of "good" (acceptable) wafers (product). Multivariate statistical analysis involve observation and analysis of more than one statistical variable at a time. The RGA data may be, in embodiments, the intensity of mass units associated with different chemicals. Mass units may range from 1 to 100, as discussed in more detail below.

In more specific embodiments of the invention, the process will use a principal component analysis based batch model to determine a baseline associated with accepted or acceptable product (e.g., wafers) which has already been successfully processed. In embodiments, each wafer is considered a batch; however, it is contemplated that other batch definitions can also be implemented with the invention. The principal component analysis based batch model may take into consideration other attributes for analysis such as, for example, quality of the batch. The number of good wafers for analysis can vary, but may be 200 wafers for an illustrative example. This baseline will be used in subsequent steps for comparison and diagnostic evaluation of wafers (or other types of product) in a fabrication process.

At step 305, the model is rolled out to manufacturing for validation. In this step, the model is tested against product, e.g., wafers, during fabrication processes. For example, the model is tested against contaminated (bad or unacceptable) and non-contaminated (good or acceptable) product.

At step 310, the validated model is applied to RGA data of historical alarms whose root causes have already been identified. Typically, the root causes are identified with the assistance of a process team and wafer owner, from historical and institutional knowledge. In this manner, for each RGA alarm, the model will produce a list of variables (contributors) that are characteristic of that specific type of alarm. In one embodiment, it has been found that the identification of the top three contributors will be sufficient to diagnose the root cause of any future detected contamination.

At step 315, the variables (e.g., top contributors of historic alarms), in mass units, are stored in the database along with the root causes of the alarms. In one embodiment, the root causes and generated variables may be stored in a table. The table (e.g., RGA Alarm classification Table) is created based on the extensive knowledge of semiconductor process and know-how of the RGA application and Multivariate Analysis, as discussed above. The steps 300-315 may be considered build time steps, in implementing the processes of the invention.

An exemplary table is shown below. In this exemplary table (e.g., library), different root causes are shown, with relation to different ranked contributors. For example, the RGA alarm classification provides the root cause of the alarm, which can be chemical residual, process integration issues, and/or equipment issues. In this example, three root causes are shown; although, the invention contemplates the tabulation of more or less than three root causes. In this example, a list of the three largest contributors is provided, related to a specific root cause "One", "Two" or "Three". The table also provides a comments field in which the engineers, team members, etc., may enter comments related to their experiences with a specific root cause. That is, the RGA alarm classification information also provides suggestions of how to dispose the alarm.

| RGA ALARM CLASSIFICATION | LARGEST CONTRIBUTOR | SECOND CONTRIBUTOR | THIRD CONTRIBUTOR | COMMENTS |
| --- | --- | --- | --- | --- |
| Alarm Root Cause 1 | Mass 99 | Mass 98 | Mass 70 | An identical event happened on mm/dd/yyyy |
| Alarm Root Cause 2 | Mass 67 | Mass 82 | Mass 20 | Look for sign of residual on the wafer |
| Alarm Root Cause 3 | Mass 59 | Mass 58 or 34 | Mass 58 or 34 | Check the back side of the wafer |
| Alarm Root Cause N | | | | |

Still referring to FIG. 3, at run time, the RGA scan (monitoring) is performed and its data is fed to the model in real time for analysis, at step 320. The RGA scan is an observation with one wafer typically having 20 observations based on the run time of a degas process (e.g., about 3-4 seconds per scan in a run time of about 60 to 70 seconds for a degassing process).

At step 325, the model will generate the top contributors of the alarm. At step 330, the process of the invention compares the top contributors of historic alarms and the top contributors of the current alarm, via the entries stored in the RGA Alarm Classification Table. A match will indicate a root cause of the abnormal condition such as contamination, undesirable process variability and/or equipment malfunction in wafer processing.

At step 335, if there is a match, the classification information will be sent to the manufacturing team through a notification system. More specifically, if a match is identified, the classification information will be sent inside the RGA alarm notification to the manufacturing team through a "Fabrication Notification System." In this manner, by now knowing root cause of the RGA alarm, the manufacturing team is capable of disposing of the RGA alarm without the need of looking into the wafer history or the involvement of process engineering.

Figure 4:
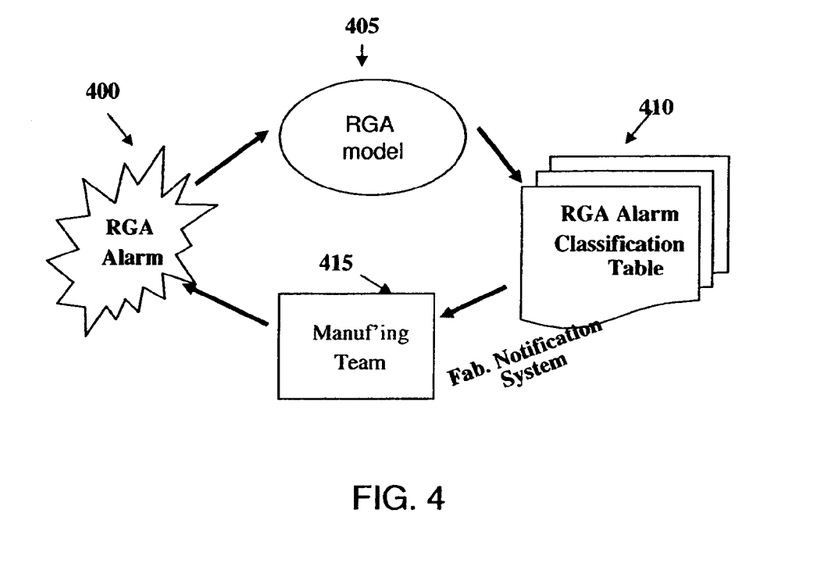
FIG. 4 shows a flow diagram of an overall system view of the processes of the invention.

FIG. 4 shows a flow diagram of an overall system view of the processes of the invention. At step 400, an RGA alarm is triggered based on a detected abnormal condition. At step 405, the RGA data of the alarmed wafer is analyzed with the model. At step 410, the alarm information is compared to the contributors in the table, e.g., Root Alarm Classification Table. By making such comparisons, a root cause of the contamination (or other abnormal condition such as, undesirable process variability and equipment malfunction) can be determined. At step 410, the Fabrication Notification System will inform the manufacturing team of the root cause of the alarm. In turn, the manufacturing team can promptly address the problem, reducing any downtime of the tool. By reducing the downtime of the tool, the throughput of the system is increased.

Pattern Matching Test

Figure 5:
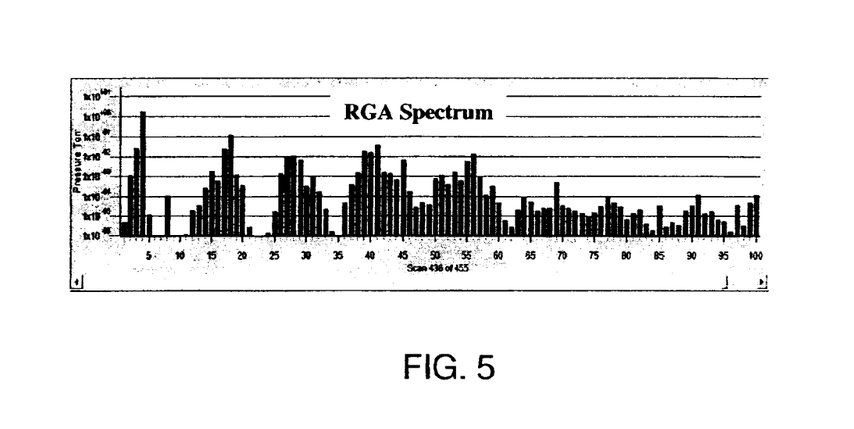
FIG. 5 shows a spectrum graph of RGA data.

As a non-limiting example, FIG. 5 shows a spectrum graph of RGA data. The spectrum graph shows mass units vs. Pressure in Torr. The "Y" axis (pressure) is representative of the mass intensity. In the example of FIG. 5, the mass units are represented as bars and may be considered variables. The mass units may range in value from 1 to 100; although other values are also contemplated by the invention. In embodiments, each mass unit represents a specific atomic mass of an chemical specie. For example, $O_2$ would have a mass unit of 32, e.g., 8 protons and 8 neutrons for each oxygen atom; whereas a certain type of photoresist usually shows high level of mass 56. A high level of any of the mass units may be indicative of contamination (or undesirable process variabilities or equipment malfunctions).

Figure 6A:
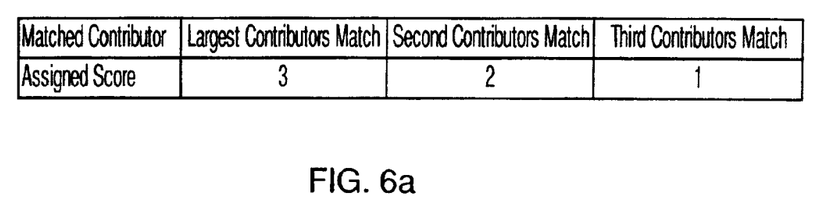
FIGS. 6a and 6b show a pattern matching test in accordance with the invention.
Figure 6B:
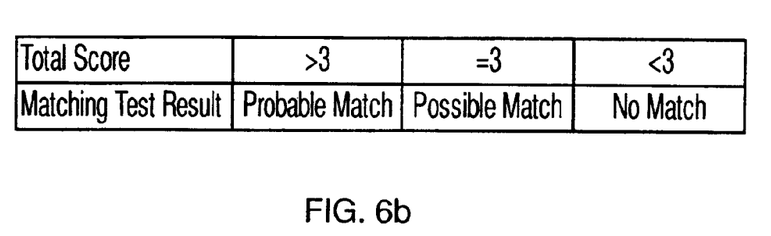

FIGS. 6a and 6b show an illustrative pattern matching test contemplated by the invention. In this example, the top three contributors of each classified (previously identified) alarm is saved in a database (storage "S") and compared with the corresponding top three contributors of the new RGA alarm. In embodiments, as noted herein, the comparison may be more or less than the top three contributors, depending on the particular application of the invention.

As shown in FIG. 6a, a score is assigned for each matched contributor. In the scoring system shown, for example, a value of "3" is provided to the largest matched contributor, a value of "2" is provided to the second largest matched contributor, and a value of "1" is provided to the third matched contributor. As should be understood, different values are also contemplated by the invention, depending on the amount of contributors, etc.

The total value assigned to each classified alarm indicates how well the classified alarm matches the new RGA alarm. In the example of FIG. 6b, a total score of greater than "3" is a probable match, a total score of "3" is a possible match and a total score of less than "3" is a probable no match. As should be understood, other scoring systems are also contemplated by the invention, and that the above is only one illustrative example.

EXAMPLES OF USE

Figure 7:
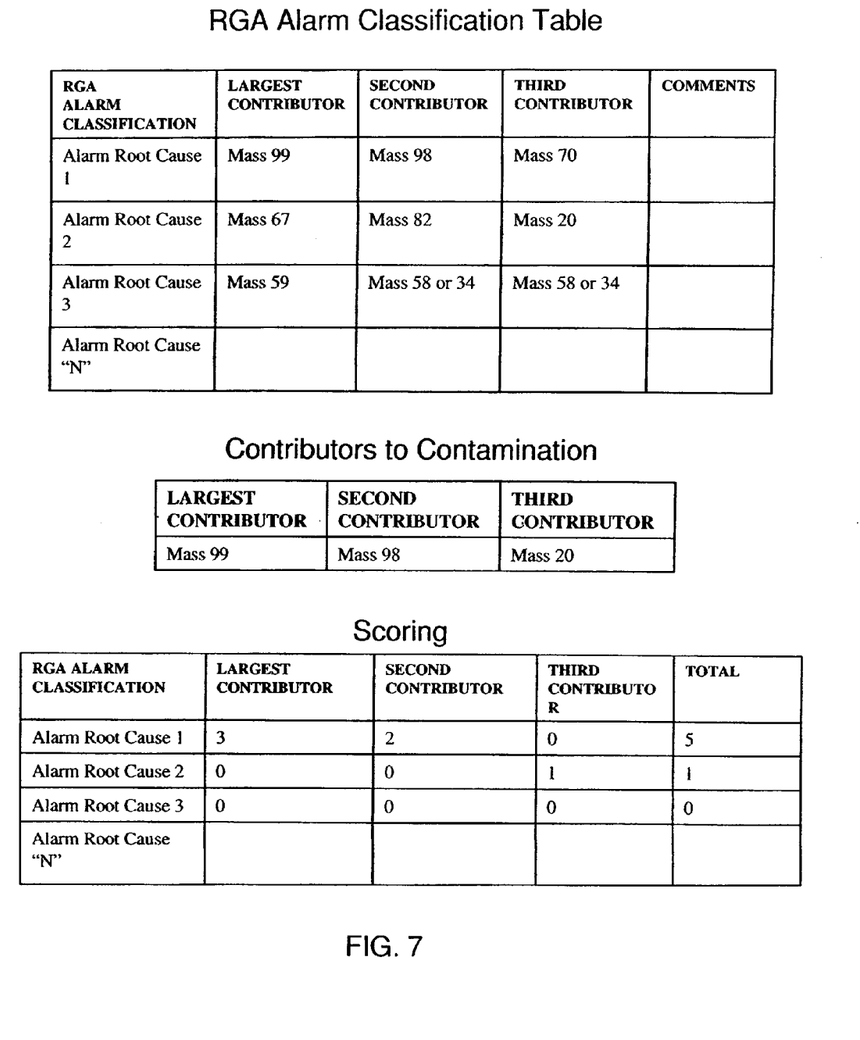
FIG. 7 shows a representative example implementing features of the invention.

FIG. 7 shows a representative example implementing features of the invention. In this example, three tables are shown: an RGA Alarm Classification Table; RGA data (contributors to contamination); and a scoring table. The RGA Alarm Classification Table shows certain contributors mapped to known root causes. The RGA data shows top contributors of contamination (or undesirable process variabilities or equipment malfunctions) associated with a current wafer (as found, e.g., in the spectrum of FIG. 5), and the scoring table shows the likely root causes of the contamination (or other abnormal conditions such as, undesirable process variabilities and equipment malfunctions in wafer processing).

In this example, the RGA data shows that the highest contamination contributor, for example, is associated with a mass unit of 99, a second highest contamination contributor is associated with a mass unit of 98 and a third highest contamination contributor is associated with a mass unit of 20. Using the scoring system described above, by comparing the RGA data to the RGA Alarm Classification Table, it can be determined that the alarm for root cause 1 has a value of "5", the alarm for root cause 2 has a value of "1" and the alarm for root cause 3 has a value of "0".

By using the table of FIG. 6a, it can be determined that the alarm of root cause 1 is a probable match since the value is greater than "3". On the other hand, the alarm for root cause 2 and root cause 3 is a probable no match, based on historical information. As such, it can be determined with a great deal of certainty that the root cause 1 was the most probable cause of the contamination (or other abnormal condition such as, undesirable process variability and equipment malfunction in wafer processing) which, in turn, allows the engineers or technicians to immediately focus on such root cause.

Figure 8:
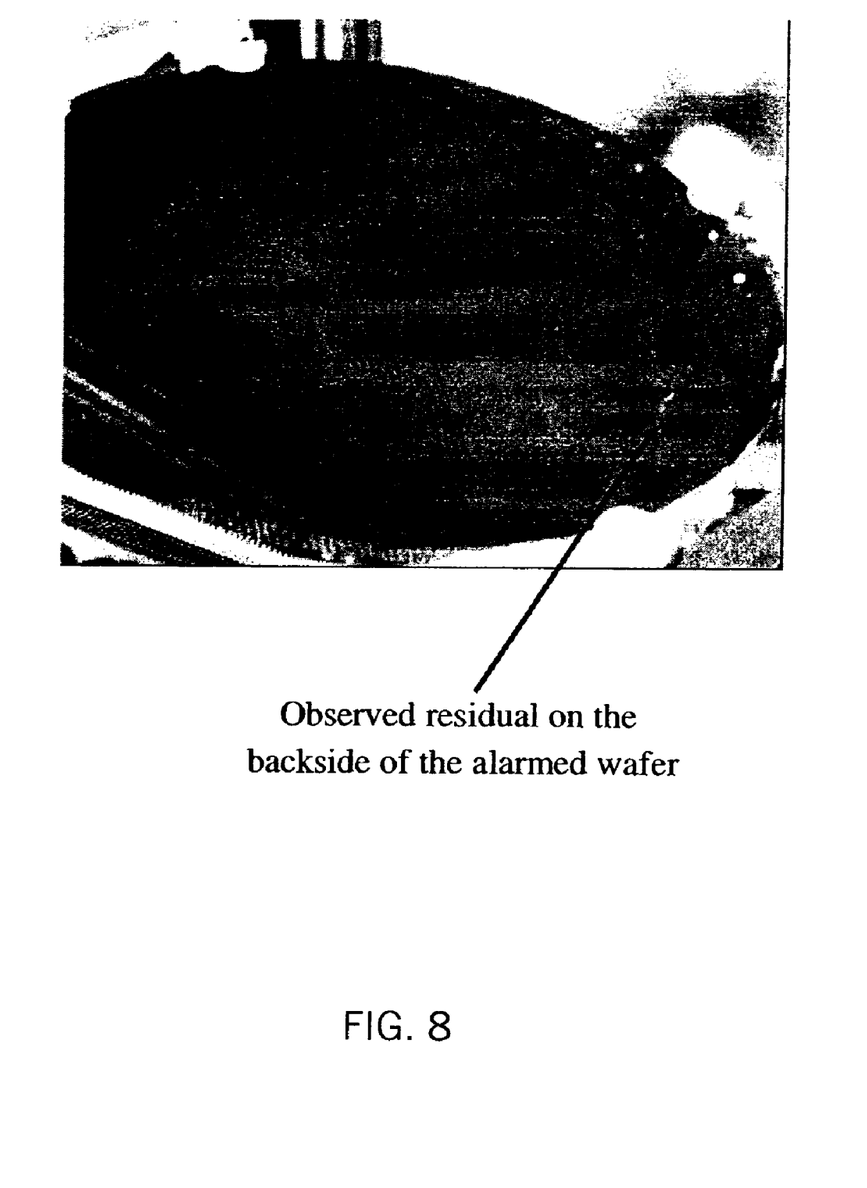
FIGS. 8 and 9 show examples implementing the processes and systems of the invention.

FIG. 8 shows an example implementing the processes and systems of the invention. In FIG. 8, a residual on the backside of an alarmed wafer is observed based on comparisons of the RGA Alarm Classification Table and RGA data, as implemented by the invention. By way of example, the fault detection results show that the distance to the model (DModX) is 8.73272, indicating that there is a deviation from the model of 8.73272. (A DModX>1 is representative of significant deviation from the model.) Masses 59, 58 and 34 are shown to be contributing to this deviation, where each mass contributes a certain percentage to the deviation, e.g., how much each mass number contributes to the deviation. In particular, 1) Mass 59__1=36.14%
2) Mass 58__1=16.32%
3) Mass 34__1=9.22%

As should be understood, in this example, Mass 59 is the largest contributor with a contributing percentage of 36.14%, with Masses 58 and 34 being smaller contributors, respectively. A root cause can be found by comparing these mass numbers to the RGA Alarm Classification Table. In this example, the probable cause is a TMAH_Photoresist Developer which usually results in a white stain on the backside of the wafer.

Figure 9:
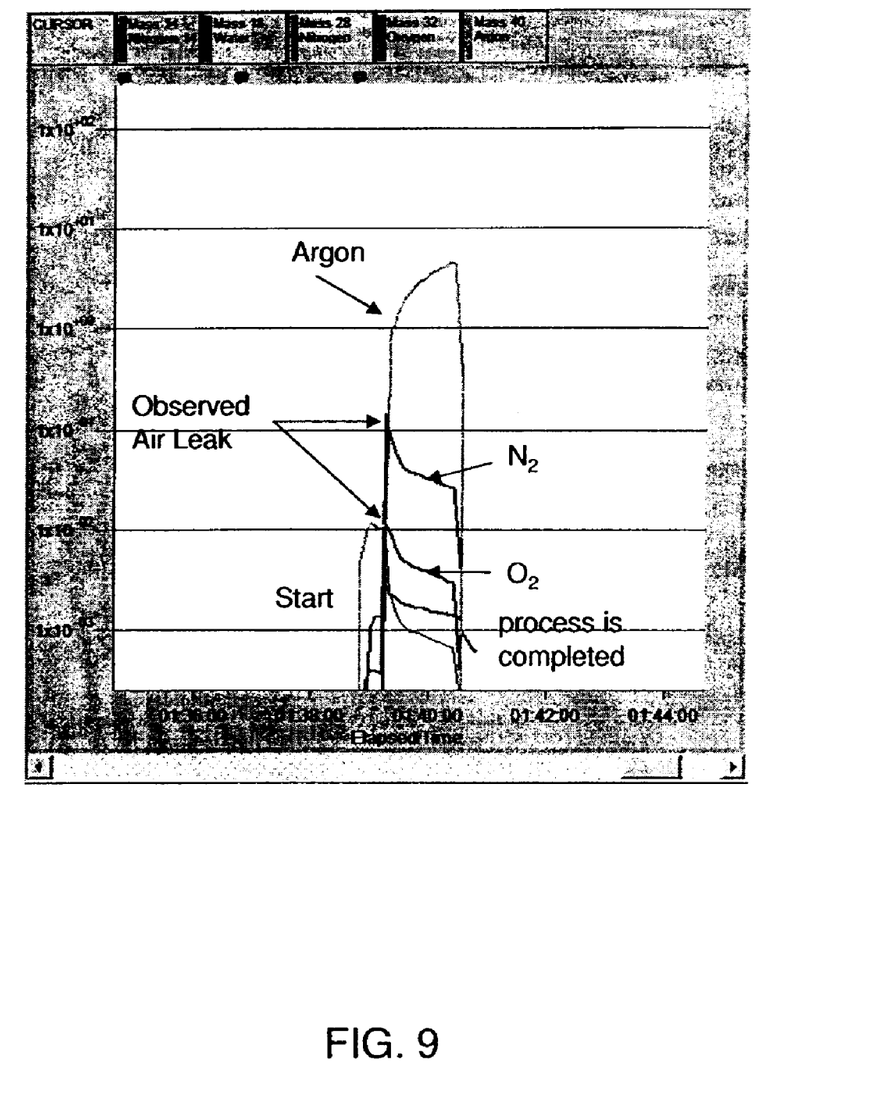

FIG. 9 shows another example implementing the processes and systems of the invention. In FIG. 9, an air leak or $N_2$ purge is the likely root cause of the RGA alarm based on comparisons of the RGA Alarm Classification Table and RGA data, as implemented by the invention. By way of example, the fault detection results show that the distance to the model (DModX) is 84.8508, indicating that there is a deviation from the model. Masses 28, 14 and 32 are shown to be contributing to this deviation, where each mass contributes a certain percentage to the variance, e.g., how much each mass number contributes to the deviation. In particular, 1) Mass 28_1=48.13%
2) Mass 14_1=27.07%
3) Mass 32_1=22.55%

As should be understood, in this example, Mass 28 is the largest contributor with a contributing percentage of 48.13%, with Masses 14 and 32 being smaller contributors, respectively. A root cause can be found by comparing these mass numbers to the RGA Alarm Classification Table. In this example, the probable cause is an air leak or $N_2$ purge. Using this information, the engineer or technician will focus on determining the source of the leak; instead of looking to the wafer history.

Semiconductor Devices

The system and method as described herein may be used in the manufacture of semiconductor devices. The semiconductor devices may be part of the design for an integrated circuit chip. In embodiments, the chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those skilled in the art will recognize that the invention can be practiced with modifications and in the spirit and scope of the appended claims.

What is claimed is:

1. A real-time alarm classification system, comprising:
a computer infrastructure operable to:
use a validated model to generate top contributors associated with an alarm triggered by a sensed abnormal condition;
compare the top contributors to contributors of historic RGA (residual gas analyzer) alarms of known root causes that were generated by the validated model; and
provide a probable root cause of the sensed abnormal condition when a match is found between the top contributors of the sensed abnormal condition and the contributors associated with the historic RGA alarms of known root causes, wherein
the validated model is a validated principal component analysis based batch model created using data of accepted product, which determines a baseline of acceptable product,
the validated model is validated by applying a model against accepted and non-accepted product in a current process,
the abnormal condition is at least one of a contaminant, process variability and equipment or tool malfunction, and
wherein the computer infrastructure is operable to:
generate a list of contributors that is characteristic of a specific type of alarm triggered by the RGA,
obtain RGA data which is an intensity of mass units associated with chemicals,
store the list of the contributors in a database along with associated known root causes which are compared to the top contributors of the sensed abnormal condition,
notify a team member of the root cause of the alarm,
provide a value to each of the top contributors, and assign a total score based on the matches found between the top contributors of the sensed abnormal condition and the contributors associated with the known root causes, and
provide fault detection results as a value of distance to the validated model and provide the top contributors as a percentage to a total deviation to the validated model.

2. A method comprising:
monitoring a process for abnormal conditions;
comparing abnormal condition data of a found abnormal condition to a library that has historical abnormal condition data associated with known root causes;
identifying a root cause of the found abnormal condition;
notifying a team member of the root cause associated with the abnormal condition;
triggering an alarm when the abnormal condition is found;
building a model which is a principal component analysis based batch model using historic data of acceptable product, wherein
a validated model is validated by applying the model to accepted and non-accepted product under test, wherein the validated model is applied to RGA data of historical alarms whose root causes have already been identified and the abnormal condition data is analyzed using the validated model to find top contributors of the found abnormal conditions, the abnormal conditions are at least one of contamination, process variabilities and equipment or tool malfunction, at run time, the RGA monitoring is performed and RGA data of the monitoring is fed to the model in real time for analysis and the model generates top contributors of the alarm, which are compared against the top contributors of historical abnormal conditions with known root causes.

* * * * *